United States Patent
Trevino

(10) Patent No.: US 6,546,844 B1
(45) Date of Patent: Apr. 15, 2003

(54) TORTILLA TOASTER-LIKE WARMER APPLIANCE

(76) Inventor: Alberto Trevino, P. O. Box 2589, Winter Haven, FL (US) 33880-2589

(*) Notice: Subject to any disclaimer, the term of this patent is extended or adjusted under 35 U.S.C. 154(b) by 0 days.

(21) Appl. No.: 10/122,938

(22) Filed: Apr. 12, 2002

(51) Int. Cl.⁷ .......................... A47J 37/00; A47J 37/08; A47J 37/10; A47J 43/20; A23L 1/00
(52) U.S. Cl. .................. 99/327; 99/329 P; 99/329 RT; 99/385; 99/389; 99/391
(58) Field of Search .................. 99/326–333, 385–391, 99/393, 349, 339, 340, 444–450; 219/492, 494, 497, 482, 386, 501, 521, 524; 426/391, 745, 445, 465, 496, 515, 523, 524

(56) References Cited

U.S. PATENT DOCUMENTS

| | | | | |
|---|---|---|---|---|
| 3,759,165 A | * | 9/1973 | Wallace ........................ | 99/427 |
| 4,147,924 A | * | 4/1979 | DeWitt, Jr. .................. | 219/417 |
| 4,346,651 A | * | 8/1982 | Schickedanz ............. | 99/339 X |
| 4,368,379 A | * | 1/1983 | Swanson ..................... | 219/494 |
| 4,987,827 A | * | 1/1991 | Marquez ....................... | 99/331 |
| 5,400,704 A | * | 3/1995 | Huston ......................... | 99/450 |
| 5,728,416 A | * | 3/1998 | Bono et al. .................. | 426/113 |
| 6,006,656 A | * | 12/1999 | Lulofs et al. ................. | 99/327 |
| 6,186,055 B1 | * | 2/2001 | DeMars et al. ............... | 99/340 |
| 6,205,911 B1 | * | 3/2001 | Ochoa .......................... | 99/331 |
| 6,245,374 B1 | * | 6/2001 | Thomas et al. ............. | 426/549 |
| 6,257,126 B1 | * | 7/2001 | Veljkovic et al. ............. | 99/349 |

* cited by examiner

Primary Examiner—Timothy F. Simone
(74) Attorney, Agent, or Firm—George A. Bode; Lisa D. Velez; Bode & Associates

(57) ABSTRACT

A tortilla warming appliance for warming one or more tortillas in a manner similar to a toaster. The tortilla warming appliance comprises a collapsible tortilla cage for each tortilla and a push-down, pop-up, arc-shaped cradle assembly slidably coupled in a respective tortilla cage. The cradle assembly has a concave center section, which defines an arc that approximates a curved perimeter edge of the tortilla. Furthermore, the width of the front and back tortilla cage wall is greater than the diameter of a commercially available tortilla.

17 Claims, 4 Drawing Sheets

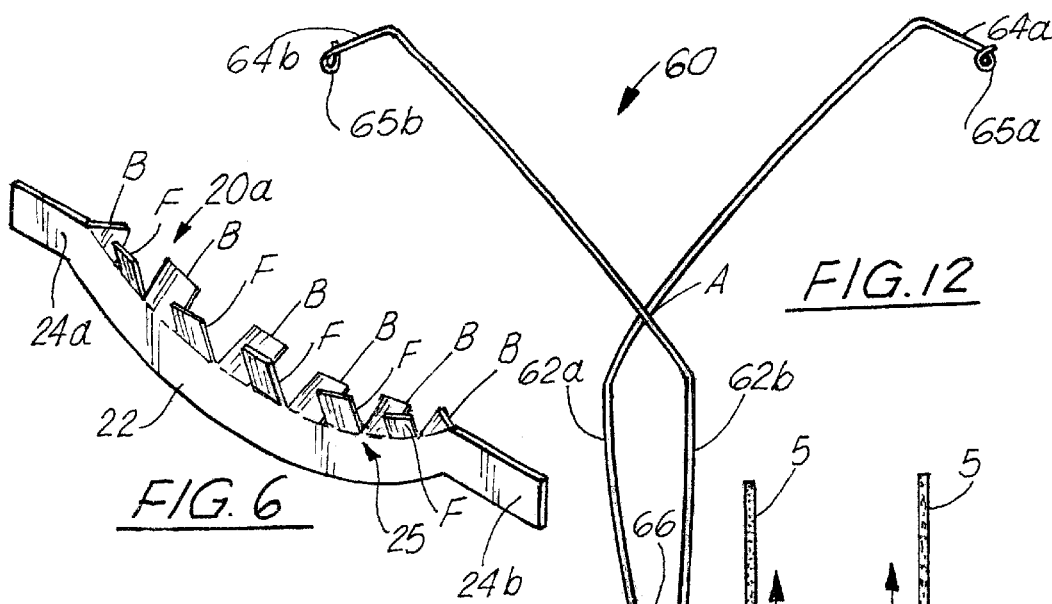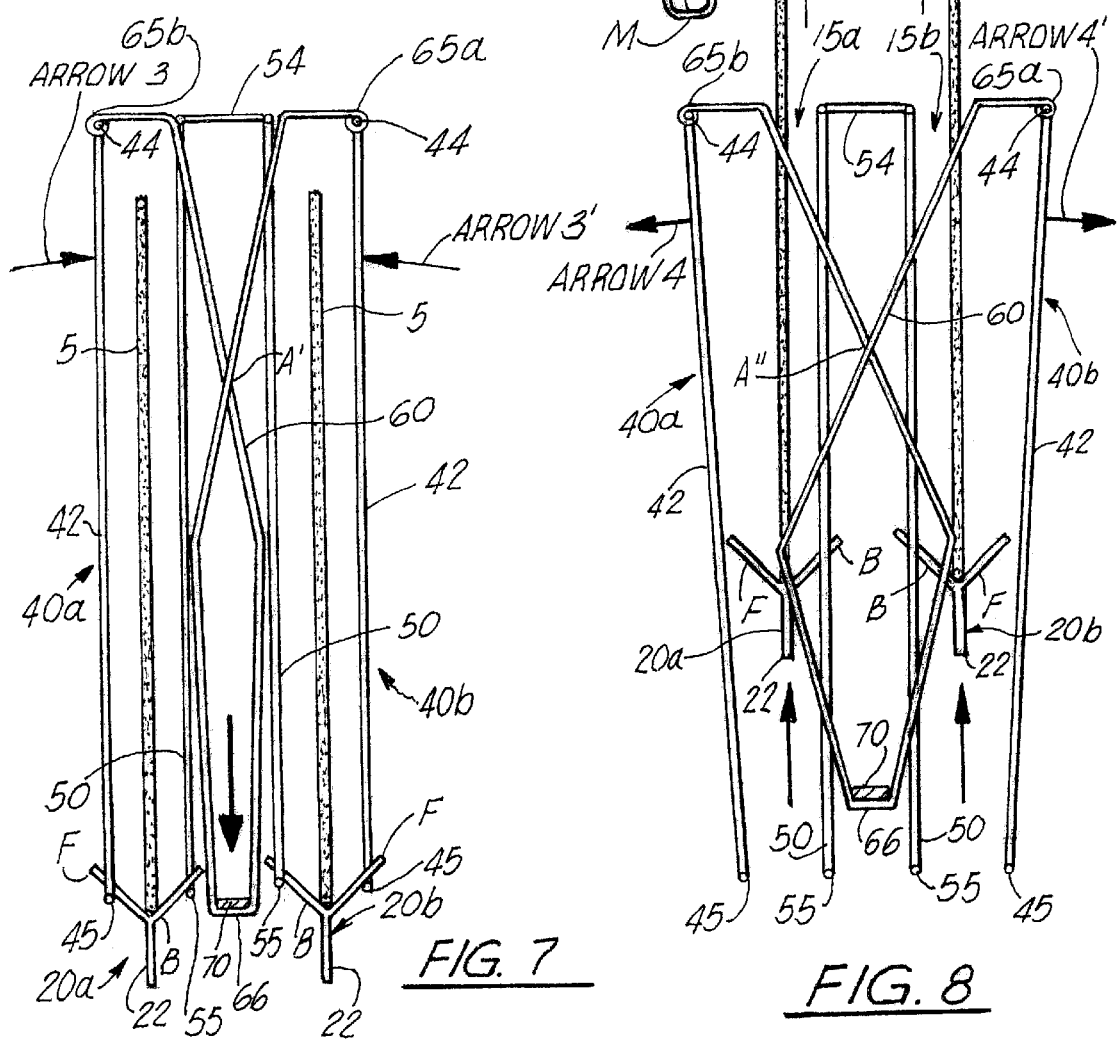

TORTILLA TOASTER-LIKE WARMER APPLIANCE

BACKGROUND OF THE INVENTION

1. Field of the Invention

The present invention relates to electric appliances and, more particularly, to a tortilla toaster-like warmer appliance which includes a push-down, pop-up, arc-shaped cradle assembly and at least one collapsible tortilla cage.

2. General Background

Toasters for bread and other pastries have been well established and are generally standardized in their ability to accept sliced bread within a industry standardized size range. Toasters have been used for heating other pastries such as waffles, pop tarts, etc. However, these pastries have size limits which can be accommodated by conventional toasters.

Examples of toasters and accessories for use therewith include: U.S. Pat. No. 4,346,651 issued W. Schickedanz, entitled "TOASTER FOR BREAD AND OTHER FOOD ITEMS"; U.S. Pat. No. 6,006,656 issued to U.S. Philips Corporation, of New York, N.Y., on the application of K. J. Lulofs, et al., entitled "TOASTER WITH POWER OUTPUT CONTROL"; U.S. Pat. No. 5,728,416 issued to The Proctor & Gamble Company, of Cincinnati, Ohio, on the application of J. L. Bono, et al., entitled "CONTAINER FOR HEATING FROZEN FRENCH FIRES IN A TOASTER"; and, U.S. Pat. No. 4,368,379 issued to Sunbeam Corporation, of Chicago, Ill., on the application of C. E. Swanson, entitled "TOASTER HAVING TOASTING CONTROL FOR CONVENIENCE FOODS," all of which disclose toasters or accessories for bread and other food items. The toasters have a casing with vertical food-receiving spaces, movable food carriers within the spaces and electrical heating elements to toast or warm the food in the space.

Most conventional toasters have slots which are approximately 5½ inches long and 1¼ inches wide. Tortillas are commercially available in various sizes. However, the typical tortillas commercially available have approximately a 6-inch diameter or a 7-inch diameter. The thin, flat but large size of the tortillas is not readily received in the slots of conventional toasters. Thus, tortillas have been heated, warmed or cooked by other cooking methods such as microwaving and pan frying.

Several devices have been patented which are directed to cooking tortillas.

U.S. Pat. No. 5,400,704 issued to R. Huston, entitled "TORTILLA COOKING APPARATUS AND METHOD," discloses a tortilla cooking apparatus having perforated, microwave energy-transparent frame members between which a tortilla is positioned for cooking in a microwave oven.

U.S. Pat. No. 4,147,924 issued to C. M. DeWitt, Jr., entitled "TORTILLA WARMER" discloses a tortilla warmer having a housing having resistive heating elements therein for warming a plate and a ceramic vessel for holding tortillas.

U.S. Pat. No. 3,759,165 issued to D. C. Wallace, entitled "DEVICE FOR HOLDING TORTILLA DURING THE COOKING THEREOF" discloses a device for holding folded-over tortillas while immersed in oil during cooking.

U.S. Pat. No. 6,186,055 issued to DeMars et al., entitled "TURNTABLE COOKING AND SERVING APPLIANCE" discloses a turntable cooking and serving appliance which includes a tortilla attachment.

As will be seen more fully below, the present invention is substantially different in structure, methodology and approach from that of the prior tortilla cooking or warming devices.

SUMMARY OF THE PRESENT INVENTION

The preferred embodiment of the tortilla toaster-like warmer appliance of the present invention solves the aforementioned problems in a straight forward and simple manner.

Broadly, the present invention contemplates a tortilla warming appliance for warming one or more tortillas in a manner similar to a toaster. The tortilla warming appliance comprises a collapsible tortilla cage for each tortilla and a push-down, pop-up, arc-shaped cradle assembly slidably coupled in a respective tortilla cage. The cradle assembly has a concave center section, which defines an arc that approximates a curved perimeter edge of the tortilla. Furthermore, the width of the front and back tortilla cage wall is greater than the diameter of a commercially available tortilla.

In view of the above, an object of the present invention is to provide a tortilla toaster-like warmer appliance which warms or heats tortillas without crisping or dehydrating the tortilla so that after it is warms it may be rolled or folded.

Another object of the present invention is to provide a tortilla toaster-like warmer appliance which includes slots to a collapsible tortilla cage dimensioned to slide therethrough a flat and open tortilla.

In view of the above, a feature of the present invention is to provide a tortilla toaster-like warmer appliance which is relatively easy to use.

Another feature of the present invention is to provide a tortilla toaster-like warmer appliance which can heat or warm without significant dehydration, crisping more than one tortilla, simultaneously, in a commercial or non-commercial environment.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 6 illustrates a perspective view of the push-down, pop-up, arc-shaped cradle assembly of the present invention;

FIG. 7 illustrates the resistance coil collapsing the tortilla cage of the present invention;

FIG. 8 illustrates the resistance coil spreading the four tortilla cage of the present invention;

DETAILED DESCRIPTION OF THE PREFERRED EMBODIMENT

Figure 1:
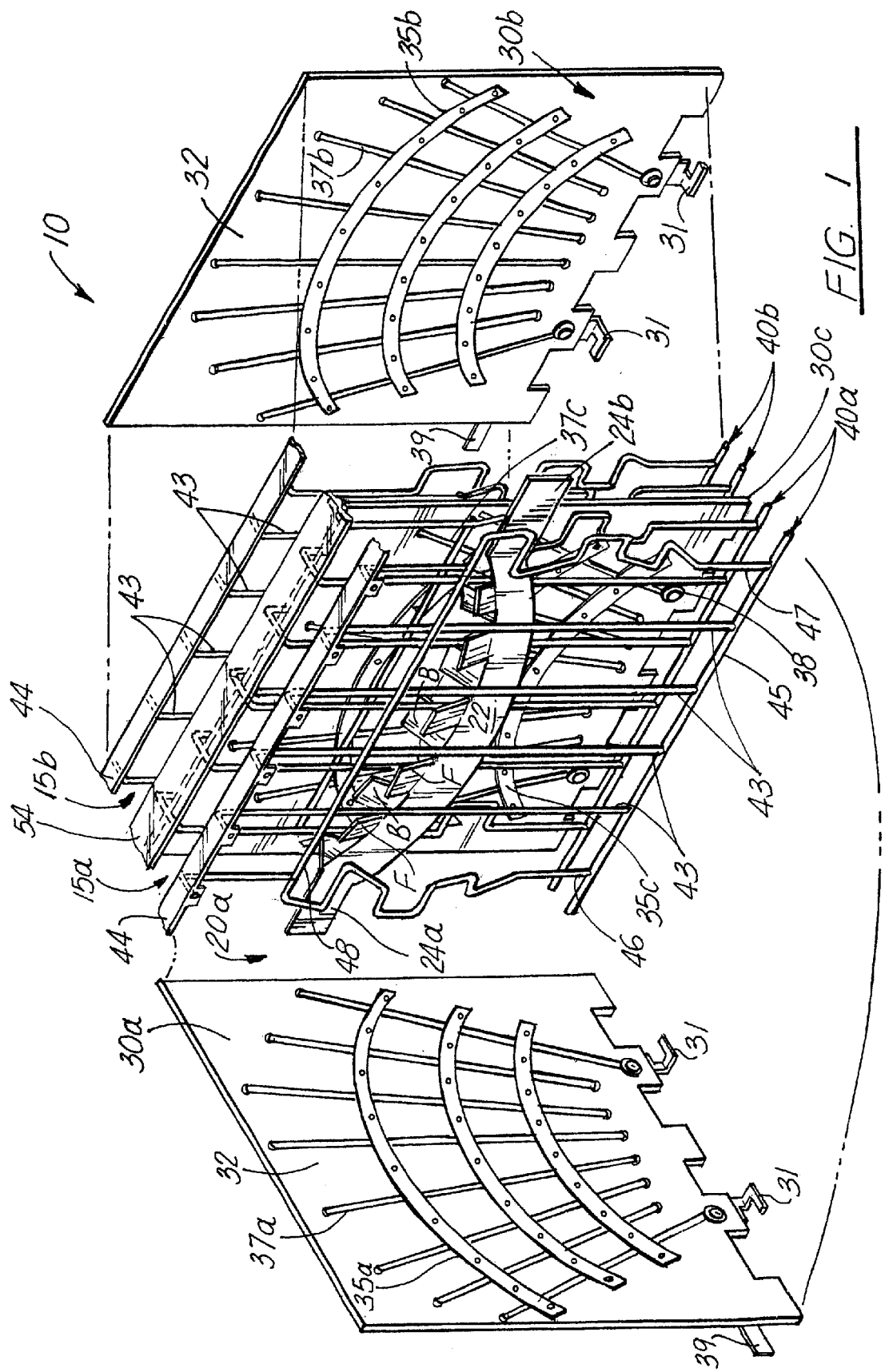
FIG. 1 illustrates the internal components of the tortilla toaster-like warmer appliance of the present invention.

Referring now to the drawings and in particular FIG. 1, the tortilla toaster-like warmer appliance of the present invention is generally referenced by the numeral 10. However, the internal components for supporting and heating the tortilla 5 are shown. The tortilla toaster-like warmer appliance 10 operates similar to and resembles a toaster in that two slots 15a and 15b are provided to slide fully open and flat tortillas 5 (FIG. 9) therethrough. Thereafter, activation of a push-down lever or handle (NOT SHOWN) pushes down or lowers a push-down, pop-up, arc-shaped cradles 20a and 20b (See FIGS. 6, 7 and 8) which thereby lowers tortillas 5 and applies power to (turns "on")the heating elements 35a, 35b, 35c, 35c' and 37a, 37b, 37c, 37c' to warm the tortillas 5 in tortilla cages 40a and 40b.

The object of the warming is preferably not toasting or crisping of the tortillas 5 which dries out the tortillas. When a tortilla 5 is dried out or crisped, the tortilla 5 cannot be easily rolled about a filling. If the tortilla 5 is dried or crisped, the tortilla 5 tends to crack and break. Instead, the heating or warming of the tortillas 5 is, preferably, limited so that the tortillas 5 are hot but not significantly depleted of moisture or crisped. Nevertheless, as with conventional toasters an adjustable thermostat can be provided to adjust the warming or heating of the tortillas 5.

In the exemplary embodiment, there are two slots 15a and 15b and two collapsible tortilla cages 40a and 40b side-by-side. Nevertheless, the tortilla toaster-like warmer appliance 10 can have one or more slots and collapsible tortilla cages.

Figure 9:
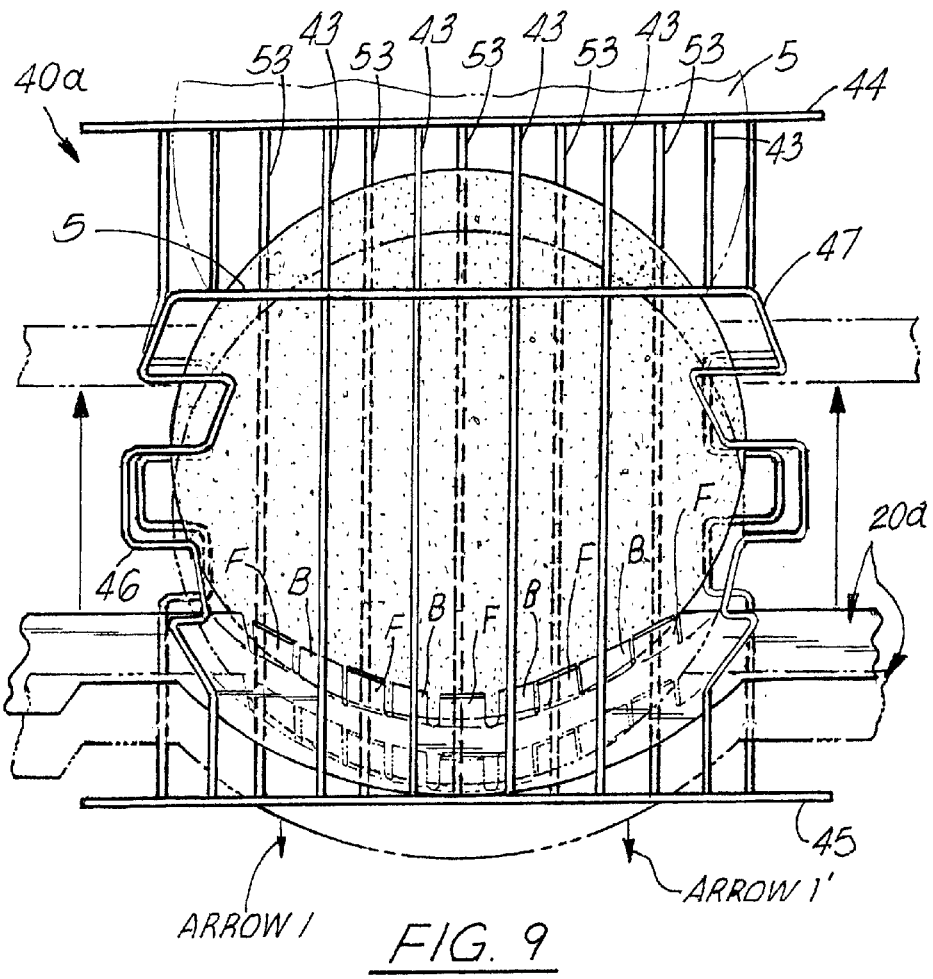
FIG. 9 illustrates a front view of the tortilla cage and which illustrates the movement of the arc-shaped cradle assembly in the tortilla cage of the present invention.
Figure 11:
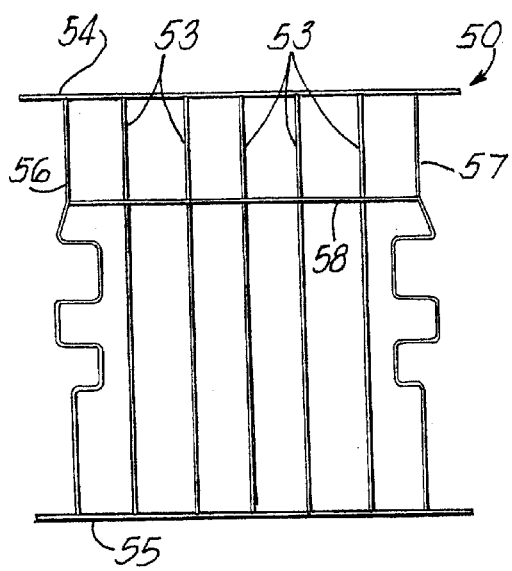
FIG. 11 illustrates the back tortilla cage wall of a tortilla cage the present invention; and, FIG. 12 illustrates the profile of the resistance coil of the present invention.
Figure 10:
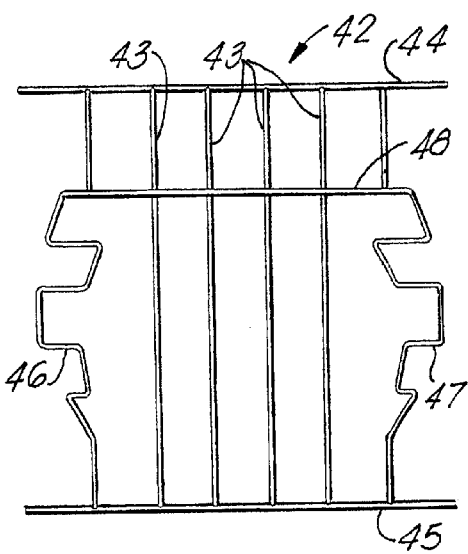
FIG. 10 illustrates the front tortilla cage wall of a tortilla cage of the present invention.

Referring also to FIGS. 9–11, since each tortilla cage 40a or 40b is essentially the same only one such tortilla cage 40a will be described in detail. Tortilla cage 40a includes a front tortilla cage wall 42 and a back tortilla cage wall 50 each of which has juxtaposed thereto a heating element wall 30a and 30c, respectively. The front tortilla cage wall 42 and the back tortilla cage wall 50 are made of metal or other heat conducting material.

The front tortilla cage wall 42 has a plurality of parallelly spaced cross bars 43, a top ledge 44 perpendicular to the parallelly spaced cross bars 43 and a bottom cross bar 45 perpendicular to the bottom distal end of the parallelly spaced cross bars 43. The front tortilla cage wall 42 further includes two end contoured cross bars 46 and 47 which are generally at least in part are parallel to the plurality of parallelly spaced cross bars 43. The contoured cross bars 46 and 47 includes alternating inward and outward square-shaped bends between the top ledge 44 and the bottom cross bar 45, which bellow slightly to cover the circular profile of the tortillas 5. A support bar 48 parallel to the top ledge 44 extends between the contoured cross bars 46 and 47 prior to the bends.

The back tortilla cage wall 50 has a plurality of parallelly spaced cross bars 53, a top ledge 54 perpendicular to the parallelly spaced cross bars 53 and a bottom cross bar 55 perpendicular to the bottom distal end of the parallelly spaced cross bars 53. The back tortilla cage wall 50 further includes two end contoured cross bars 56 and 57 which are generally at least in part are parallel to the plurality of parallelly spaced cross bars 53. The contoured cross bars 56 and 57 includes alternating inward and outward square-shaped bends between the top ledge 54 and the bottom cross bar 55. However, the contoured bends of the cross bars 56 and 57 are not generally bellowed. A support bar 58 parallel to the top ledge 54 extends between the contoured cross bars 56 and 57. The support bars 48 and 58 are positioned below ledges 44 and 54 at the starting point where the bends are formed. The back tortilla cage walls 50 of cages 40a and 40b are coupled together by ledge 54 as shown in FIGS. 7 and 8.

As best seen in FIG. 9, the parallelly spaced cross bars 43 of the front tortilla cage wall 42 are offset by the parallelly spaced cross bars 53 of the back tortilla cage wall 50. The advantage of which will be made clear below with respect to the description of the cradle assembly 20.

Referring now to FIGS. 1, 6 and 9, each tortilla cage 40a and 40b has coupled between its front tortilla cage wall 42 and its back tortilla cage wall 50 a push-down, pop-up, arc-shaped cradle assembly 20a and 20b, respectively. Since each push-down, pop-up, arc-shaped cradle assembly 20a and 20b is essentially identical only one such cradle assembly will be described in detail.

The push-down, pop-up, arc-shaped cradle assembly 20a includes a concave central section 22 and two end extension arms 24a and 24b depending from the distal ends of the concave central section 22. The top curved edge of the concave central section 22 has a plurality of angled tabs B and F wherein adjacent tabs are alternately bent forward and backward. Tabs labeled "B" represent the tabs bent backward. The tabs labeled "F" represent the tabs bent forward. The B tabs and the F tabs together form a generally "V"-shaped cradle 25 in which a tortilla 5 is supported and held for warming. The arc-shape of the concave central section 22 approximates the curvature of the tortilla's perimeter edge. Moreover, the width of the front and back tortilla cage walls 42 and 50 is greater than the diameter of commercially available tortillas.

The spacing between the B tabs and the F tabs allows the B tabs to protrude between the parallelly spaced cross bars 53 of the back tortilla cage wall 50 while the F tabs protrude through the parallelly spaced cross bars 43 of the front tortilla cage wall 42. Thereby, as the push-down, pop-up, arc-shaped cradle assembly 20a is push downward in the direction of ARROWS 1 and 1' (FIG. 9) its path is unobstructed, as best seen in FIG. 7. Likewise, the push-down, pop-up, arc-shaped cradle assembly 20a can be slide or popped upward in the direction of ARROWS 2 and 2', upon the expiration of the heating timer (NOT SHOWN).

As can be appreciated, at least one of the two end extension arms 24a and 24b depending from the distal ends of the concave central section 22 is coupled to the push-down lever or handle (NOT SHOWN).

Referring now to FIGS. 7, 8 and 12, the resistance coil 60 includes an elongated wire mechanism which folds substantially in the middle M and the coil extensions 62a and 62b formed thereby overlap or crisscross each other at point A and terminate into spring handlebar members 64a and 64b. The free ends 65a and 65b of the handlebar members 64a and 64b, respectively, are affixed to the distal ends of the top ledge 44 of the front tortilla cage wall 42 of each tortilla cage 40a and 40b, respectively.

The middle M of the resistence coil 60 is bent to form a lower platform 66 at which a lever tab 70 of the push-down lever or handle (NOT SHOWN) engages. The lever tab 70 provides a force on the platform 66 of the resistence coil 60 to raise the point at which the coil extensions 62a and 62b overlap or crisscross to point A'. As the point of overlap or crisscross rises, the front tortilla cage walls 50 of cages 40a and 40b collapse (moves in the direction of ARROWS 3 and 3') via spring handlebar members 64a and 64b, to a collapsed state, as best seen in FIG. 7. On the other hand, as the lever tab 70 releases its applied force to the platform 66 upon expiration of the timer (NOT SHOWN) the point at which the coil extensions 62a and 62b overlap or crisscross is moved down to point A". As the point of overlap or crisscross is lowered, the front tortilla cage walls 50 of cages 40a and 40b expand (move in the direction of ARROWS 4 and 4') via spring handlebar members 64a and 64b, to a non-collapsed state, as best seen in FIG. 8.

Figure 2:
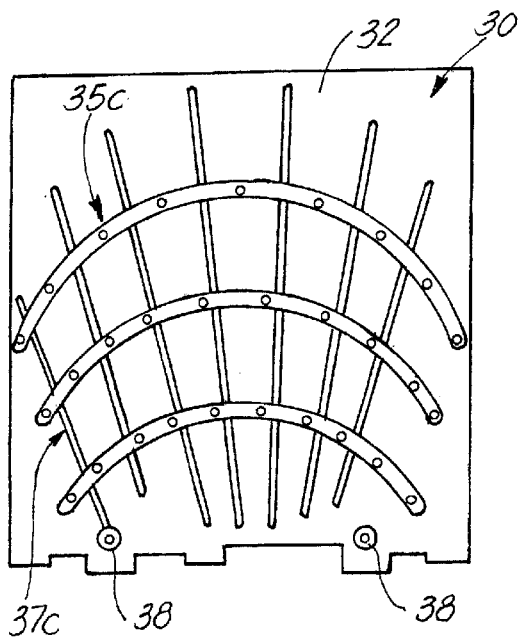
FIG. 2 illustrates the front view of the middle heating element wall shared by the first and second tortilla cages of the present invention.
Figure 3:
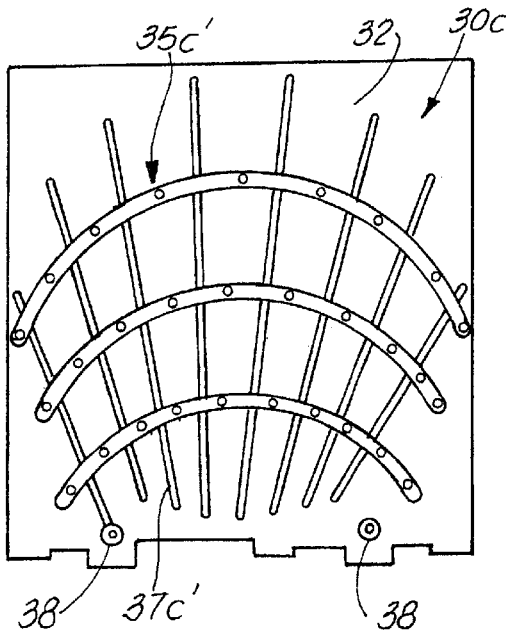
FIG. 3 illustrates the back view of the middle heating element wall shared by the first and second tortilla cages of the present invention.

Referring now to FIGS. 1–3, heat is created by two end heating element walls 30a and 30b and a middle heating element wall 30c shared by the tortilla cages 40a and 40b, as best seen in FIG. 1. The middle heating element wall 30c includes a planar substrate 32, made of mica or the like, having a plurality of arc-shaped heating elements 35c affixed to the planar substrate 32 and a plurality of radial heating elements 37c intersecting the plurality of arc-shaped heating elements 35c on a front side, as best seen in FIG. 2. Likewise, the back side includes a plurality of arc-shaped heating elements 35c' affixed to the back side of the planar substrate 32 and a plurality of radial heating elements 37c intersecting the plurality of arc-shaped heating elements 35c'. The arc-shaped heating elements 35c, 35c' and radial heating elements 37c, 37c' are electrically connected at terminals 38 extending between the back side and the front side and are aligned with or overlap each other.

Figure 4:
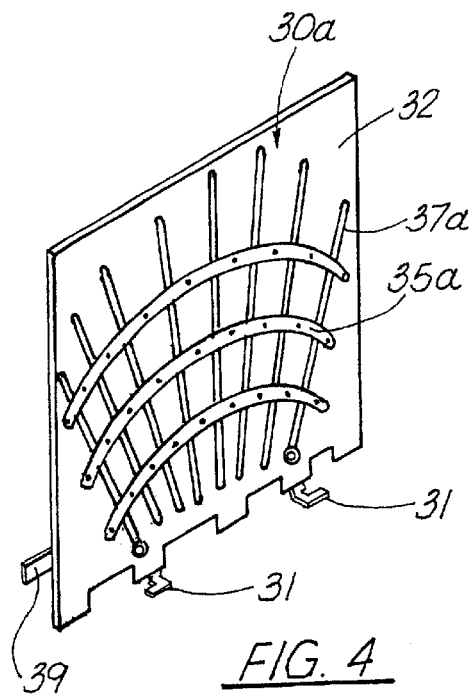
FIG. 4 illustrates a back view of end heating element wall for the first tortilla cage of the present invention.

The end heating element wall 30a or 30b has a planar substrates 32, made of mica or the like, having a plurality of arc-shaped heating elements 35a or 35b affixed to the planar substrate 32 and a plurality of radial heating elements 37a or 37b intersecting the plurality of arc-shaped heating elements 35a or 35b, respectively, as best seen in FIGS. 1 and 4.

Figure 5:
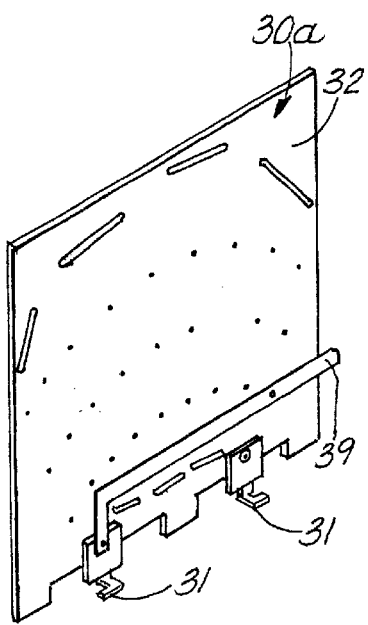
FIG. 5 illustrates a front view of the end heating element wall for the first tortilla cage of FIG. 4.

Referring now to FIG. 5, the back of the end heating element wall 30a or 30b includes an electrical contact strip 39 for powering the front-mounted arc-shaped heating elements 35a or 35b and radial heating elements 37a or 37b.

The two end heating element walls 30a and 30b and are affixed to the exterior housing (NOT SHOWN) of the tortilla toaster-like warmer appliance 10 via leg supports 31. The tortilla cage wall 42 of the cages, 40a and 40b and heating element walls 30a, 30b and 30c, are affixed and generally stationary in the exterior housing (NOT SHOWN).

In operation, a tortilla 5 is set in "V"-shaped cradle 25 of the push-down, pop-up, arc-shaped cradle assembly 20a through slot 15a. A push-down lever or handle (NOT SHOWN) is depressed so that push-down, pop-up, arc-shaped cradle assembly 20a moves to its "down" position (FIG. 7). The upper and intermediary positions of pop-up, arc-shaped cradle assembly 20a are shown in FIG. 9. Furthermore, the lever tab 70 of the push-down lever or handle (NOT SHOWN) provides a force on the platform 66 of the resistence coil 60 to raise the point at which the coil extensions 62a and 62b overlap or crisscross to point A'. Thereby, the front tortilla cage walls 50 of cages 40a and 40b collapse to a collapsed state, as best seen in FIG. 7. Furthermore, power is applied to the electrical contact strip 39 for powering the front-mounted arc-shaped heating elements 35a and 35b and radial heating elements 37a and 37b. Likewise arc-shaped heating elements 35c or 35c' and radial heating elements 37c or 37c' are energized and tortilla 5 is warmed.

The timer and switch (both NOT SHOWN) deactivate after a predetermined time or can be deactivated manually by the user. Upon deactivation, the force applied by the lever tab 70 of the push-down lever or handle (NOT SHOWN) on the platform 66 of the resistence coil 60 lowers the point at which the coil extensions 62a and 62b overlap or crisscross to point A". Accordingly, power is removed from the electrical contact strip 39, the front tortilla cage walls 50 of cages 40a and 40b expand to a non-collapsed state, as best seen in FIG. 8.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A tortilla warming appliance for warming a tortilla comprising:

a collapsible tortilla cage having front and back tortilla cage walls;

heater element walls juxtaposed to the front and back tortilla cage walls having a plurality of heater elements affixed thereto; and, a push-down, pop-up, arc-shaped cradle assembly which is slidably coupled between the front and back tortilla cage walls and has a concave center section with a top concaved edge, which defines an arc which approximates a curved perimeter edge of the tortilla and has integral therewith a "V"-shaped cradle radiating therefrom.

2. The appliance of claim 1, wherein the plurality of heater elements includes:

a plurality of arch-shaped heater elements; and, a plurality of radially intersecting heater elements intersecting the arch-shaped heater elements.

3. The appliance of claim 1, wherein:

the front tortilla cage wall includes a plurality of parallelly space bars and a top ledge; and, the back tortilla cage wall includes a plurality of parallelly spaced bars, which are offset from the plurality of parallelly spaced bars of the front tortilla cage wall, and a top ledge.

4. The appliance of claim 3, wherein:

the "V"-shaped cradle includes a plurality of alternating backward and frontwardly angled tabs;

the frontwardly angled tabs which protrude between the plurality of spaced bars of the front tortilla cage wall; and, the backward angled tabs protrude between the parallelly spaced bars of the back tortilla cage wall.

5. The appliance of claim 3, further comprising:

a resistance coil for collapsing the front tortilla cage wall toward the back tortilla cage wall.

6. The appliance of claim 5, further comprising:

a second collapsible tortilla cage having front and back tortilla cage walls; and wherein the resistance coil includes:

an elongated wire mechanism which folds substantially in a center thereof forming coil extensions which overlap or crisscross each other at a first point and terminate into spring handlebar members, the spring handlebar member having free ends which are affixed to a distal end of the top ledge of the front tortilla cage wall of the collapsible tortilla cage and the second collapsible tortilla cage.

7. The appliance of claim 1, further comprising:

a second collapsible tortilla cage having front and back tortilla cage walls for supporting a second tortilla; and, a second push-down, pop-up, arc-shaped cradle assembly which is slidably coupled between the front and back tortilla cage walls.

8. The appliance of claim 1, wherein the width of the front and back tortilla cage walls is at least 7 inches.

9. The appliance of claim 1, wherein the width of the front and back tortilla cage walls is greater than the diameter of a tortilla.

10. A tortilla warming appliance for warming at least one tortilla comprising:

at least one tortilla cage having front and back tortilla cage walls;

heater element walls juxtaposed to the front and back tortilla cage walls having a plurality of heater elements affixed thereto; and, at least one push-down, pop-up, arc-shaped cradle assembly which is slidably coupled between the front and back tortilla cage walls and has a concave center section, which defines an arc which approximates a curved perimeter edge of the tortilla and wherein the width of the front and back tortilla cage wall is greater than the diameter of a tortilla.

11. The appliance of claim 10, wherein the plurality of heater elements includes:

a plurality of arch-shaped heater elements; and, a plurality of radially intersecting heater elements intersecting the arch-shaped heater elements.

12. The appliance of claim 10, wherein:

the front tortilla cage wall includes a plurality of parallelly space bars and a top ledge; and, the back tortilla cage wall includes a plurality of parallelly spaced bars, which are offset from the plurality of parallelly spaced bars of the front tortilla cage wall, and a top ledge.

13. The appliance of claim 12, wherein the at least one push-down, pop-up, arc-shaped cradle assembly comprises:

a top concaved edge;

a "V"-shaped cradle integral with and radiating from the top concaved edge.

14. The appliance of claim 13, wherein:

the "V"-shaped cradle includes a plurality of alternating backward and frontwardly angled tabs;

the frontwardly angled tabs which protrude between the plurality of spaced bars of the front tortilla cage wall; and, the backward angled tabs protrude between the parallelly spaced bars of the back tortilla cage wall.

15. The appliance of claim 13, wherein the at least one tortilla cage is collapsible; and, further comprising:

a resistance coil for collapsing the front tortilla cage wall toward the back tortilla cage wall of at least one collapsible tortilla cage.

16. The appliance of claim 15, wherein:

the at least one collapsible tortilla cage includes first and second collapsible tortilla cages; and, the resistance coil includes:

an elongated wire mechanism which folds substantially in a center thereof forming coil extensions which overlap or crisscross each other at a first point and terminate into spring handlebar members, the spring handlebar member having free ends which are affixed to a distal end of the top ledge of the front tortilla cage wall of the first and second collapsible tortilla cages.

17. The appliance of claim 10, wherein the width of the front and back tortilla cage walls is at least 7 inches.

* * * * *